(12) United States Patent
Wuidart et al.

(10) Patent No.: US 6,465,903 B1
(45) Date of Patent: Oct. 15, 2002

(54) TRANSMISSION OF AN OPERATING ORDER VIA AN A.C. SUPPLY LINE

(75) Inventors: Luc Wuidart, Pourrieres (FR); Michel Bardouillet, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/336,299

(22) Filed: Jun. 21, 1999

(30) Foreign Application Priority Data

Jun. 22, 1998 (FR) .............................. 9808025

(51) Int. Cl.[7] .............................. H04M 11/00
(52) U.S. Cl. ...................... 307/3; 340/310.01
(58) Field of Search ............................. 323/266, 299, 323/303; 363/34, 39, 44, 84, 86; 315/307, 311; 340/310.01, 310.02; 307/3, 149

(56) References Cited

U.S. PATENT DOCUMENTS

| 3,618,089 A | 11/1971 | Moran, Jr. et al. |
| 4,068,232 A | 1/1978 | Meyers et al. |
| 4,278,977 A | 7/1981 | Nossen |
| 4,408,185 A | 10/1983 | Rasmussen ................. 340/310 |
| 4,656,472 A | 4/1987 | Walton |
| 4,782,308 A | 11/1988 | Trobec et al. |
| 4,802,080 A | 1/1989 | Bossi et al. |
| 4,814,595 A | 3/1989 | Gilboa |
| 4,963,887 A | 10/1990 | Kawashima et al. |
| 5,013,898 A | 5/1991 | Glasspool |
| 5,126,749 A | 6/1992 | Kaltner |
| 5,142,292 A | 8/1992 | Chang |
| 5,305,008 A | 4/1994 | Turner et al. |
| 5,452,344 A | 9/1995 | Larson |
| 5,493,267 A | 2/1996 | Ahlse et al. |
| 5,504,485 A | 4/1996 | Landt et al. |
| 5,521,602 A | 5/1996 | Carroll et al. |
| 5,541,604 A | 7/1996 | Meier ............................ 342/42 |
| 5,550,536 A | 8/1996 | Flaxl ....................... 340/825.54 |
| 5,604,411 A * | 2/1997 | Venkitasubrahmanian et al. ............................ 315/307 |
| 5,621,411 A | 4/1997 | Hagl et al. |
| 5,691,605 A | 11/1997 | Xia et al. .................... 315/307 |
| 5,703,573 A | 12/1997 | Fujimoto et al. ....... 340/825.54 |
| 5,767,503 A | 6/1998 | Gloton |
| 5,801,372 A | 9/1998 | Yamaguchi |
| 5,831,257 A | 11/1998 | Yamaguchi |
| 5,874,725 A | 2/1999 | Yamaguchi |
| 6,025,780 A | 2/2000 | Bowers et al. |
| 6,028,503 A | 2/2000 | Preishuberpflugl et al. |
| 6,072,383 A | 6/2000 | Gallagher, III et al. |
| 6,137,411 A | 10/2000 | Tyren |
| 6,208,235 B1 | 3/2001 | Trontelj |
| 6,229,443 B1 | 5/2001 | Roesner |
| 6,243,013 B1 | 6/2001 | Duan et al. |
| 6,265,962 B1 | 7/2001 | Black et al. |

FOREIGN PATENT DOCUMENTS

| DE | 28 35 549 A1 | 3/1979 |
| DE | 44 44 984 | 12/1994 |
| DE | 195 46 928 | 6/1997 |
| DE | 196 21 076 | 11/1997 |
| DE | 196 32 282 A1 | 2/1998 |
| EP | 0 038 877 | 11/1981 |

(List continued on next page.)

OTHER PUBLICATIONS

French Search Report from French Patent Application No. 99 09563, filed Jul. 20, 1999.

(List continued on next page.)

*Primary Examiner*—Jessica Han
(74) *Attorney, Agent, or Firm*—Wolf, Greenfield & Sacks, P.C.; James H. Morris

(57) ABSTRACT

The present invention relates to a transmitter of an analog order over an A.C. supply line meant for a load, including a one-way conduction element in parallel with a resistive element having a value that is a function of the analog order to be transmitted.

6 Claims, 5 Drawing Sheets

FOREIGN PATENT DOCUMENTS

| | | | |
|---|---|---|---|
| EP | 0 369 622 | 5/1990 | |
| EP | A-0 568 067 | 11/1993 | ............ G01S/13/02 |
| EP | 0 579 332 A1 | 1/1994 | |
| EP | 0 645 840 A | 3/1995 | |
| EP | 0 768 540 | 4/1997 | |
| EP | 0 857 981 A1 | 8/1998 | |
| EP | 0 902 475 A | 3/1999 | |
| FR | A-2 114 026 | 11/1971 | ............ H04B/3/00 |
| FR | 2 114 026 | 6/1972 | |
| FR | 2 746 200 | 9/1997 | |
| FR | 2 757 952 | 7/1998 | |
| GB | 2 298 553 A | 9/1996 | |
| GB | A-2 298 553 | 9/1996 | ............ H02J/13/00 |
| GB | A-2 321 726 | 8/1998 | ............. G05F/1/46 |
| WO | WO 93/17482 | 9/1993 | ............ H02J/13/00 |
| WO | WO 98/20363 | 5/1998 | |
| WO | WO 99/33017 | 7/1999 | |
| WO | WO 99/43096 | 8/1999 | |

OTHER PUBLICATIONS

French Search Report from French Patent Application No. 98 08025, filed Jun. 22, 1998.

French Search Report from French Patent Application No. 99 04547, filed Apr. 7, 1999.

French Search Report from French Patent Application No. 99 04546, filed Apr. 7, 1999.

French Search Report from French Patent Application No. 98 08024, filed Jun. 22, 1998.

French Search Report from French Patent Application No. 99 04548, filed Apr. 7, 1999.

French Search Report from French Patent Application No. 00/01214, filed Jan. 31, 2000.

French Search Report from French Patent Application No. 99 09564, filed Jul. 20, 1999.

French Search Report from French Patent Application No. 00/06301, filed May 17, 2000.

French Search Report from French Patent Application No. 99 04548, filed Apr. 7, 1999.

French Search Report from French Patent Application No. 99 04545, filed Apr. 7, 1999.

French Search Report from French Patent Application No. 99 07024, filed May 31, 1999.

French Search Report from French Patent Application No. 00 06302, filed May 17, 2000.

French Search Report from French Patent Application No. 00 06065, filed May 12, 2000.

French Search Report from French Patent Application No. 00 06061, filed May 12, 2000.

French Search Report from French Patent Application No. 00 06064, filed May 12, 2000.

French Search Report from French Patent Application No. 00 06071, filed May 12, 2000.

French Search Report from French Patent Application No. 99 04549, filed Apr. 7, 1999.

French Search Report from French Patent Application 99 04544, filed Apr. 7, 1999.

* cited by examiner

TRANSMISSION OF AN OPERATING ORDER VIA AN A.C. SUPPLY LINE

BACKGROUND OF THE INVENTION

1. Field of the Invention

The present invention relates to the variation of the supply power of a load supplied from an approximate D.C. voltage obtained by rectifying an A.C. voltage and, more generally, to the transmission of analog information over an A.C. supply line of a load with a capacitive input impedance.

2. Discussion of the Related Art

When it is desired to vary the supply power of a load having a resistive input impedance, a phase angle or switched phase angle variator is generally used to modulate the power transmitted to the load.

FIG. 1 shows an example of a conventional switched phase angle variator 1. Variator 1 is based on the use of a switch 2 (here a MOS transistor) connected in series with a measurement resistor Rm between two rectified output terminals 3 and 4 of a diode bridge D1, D2, D3, D4. A first A.C. terminal 5 of the bridge is connected to a terminal 6 (for example the line) of an A.C. power supply, for example mains voltage Vac, while a second A.C. terminal 7 of the bridge forms an output terminal providing a modified A.C. supply voltage Vin for the load. The other line (neutral 8) of the A.C. power supply is not interrupted. Transistor 2 is controlled by a converter 9 (for example, circuit TS555 sold by SGS-Thomson Microelectronics) connected between terminal 4 and, via a supply resistor Ra, terminal 3. Converter 9 converts a resistance variation (potentiometer 10) into a conduction time of switch 2.

The operation of a variator such as shown in FIG. 1 is well known. Circuit 9 receives a set-point order, for example, from a potentiometer 10 which sets the phase angle of the input voltage Vin. At each halfwave of voltage Vac, voltage Vin starts following the evolution of voltage Vac until switch 2 turns off under control of converter 9.

Although a variator based on such a phase switching is well adapted to applications in which the load to be supplied is of resistive type and does not require a supply from a D.C. voltage recovery, such a phase angle variator raises several problems in the case of a capacitive input impedance load.

A first problem is that, for the phase angle variation to translate as a power variation of the load, the approximate D.C. load supply voltage has to follow the power variations related to the phase angle variation. Now, the load is generally supplied via an electronic circuit drawing its own supply from the approximate D.C. voltage obtained from voltage Vin. For example, in an application to the supply of a fluorescent lamp by means of an electronic circuit forming a switched-mode converter, a variation of the approximate D.C voltage obtained from voltage Vin adversely affects the proper operation of the switched-mode converter.

Further, a switching in the charge area of a capacitor constituting the input impedance results in a significant Rms current, which is not desirable.

Independently from the input impedance of the load, a variator such as illustrated in FIG. 1 has another disadvantage which is to generate a significant dissipation due to the switching of switch 2 (for example, a MOS transistor) when said switch conducts the current for the load.

Accordingly, especially for loads having a capacitive input impedance, other means than the phase angle variation are conventionally used to act upon the load operation.

FIG. 2 very schematically shows the electric connection of a system 11 for supplying a load 12 (Q) from an A.C. voltage Vin, having a bridge 13 rectifying voltage Vin and a circuit 14 for supplying of load 12 from an approximate D.C. voltage Vout. Voltage Vout is taken across a capacitor C receiving a rectified A.C. output voltage from bridge 13.

Input voltage Vin of system 11 generally is, for a load having a capacitive input impedance such as shown, the unmodified A.C. supply voltage Vac, for example the mains voltage. The power variation function is generally performed from an analog low voltage input E of circuit 14. The signal applied to terminal E is used, for example in an application to a fluorescent lamp, to modify the frequency of the alternating current provided by switched-mode converter 14 to vary the light intensity. This light intensity dimming control terminal E is meant to be controlled by an external variator 15 setting a control voltage generally included between 0 and 5 volts and proportional to the desired light intensity.

A major disadvantage of this variation solution is the need for a low voltage link 16 between system 11 controlling load 12 and a generally remote mechanical potentiometer-switch (variator 15). As illustrated in FIG. 2, in addition to the two conductors (line and neutral) of A.C. supply Vin, two low voltage conductors (link 16) indeed have to be provided between switch 15 including a dimmer and electronic system 11 (more specifically circuit 14) for controlling load 12.

Another conventional solution to transmit a light intensity order to a load supply control circuit 14 consists of performing a carrier current modulation, that is, modulating the alternating supply current with a high frequency signal transmitting the order (for example, of light intensity). Such a solution requires, on the side of dimmer 15, a carrier current modulation system (not shown) to transmit the order and, on the side of electronic system 11, a demodulator (not shown) for extracting the power order from the A.C. supply.

Such a solution has the advantage of avoiding the use of an additional low voltage link 16. However, it has the disadvantage of being of particularly complex and expensive to implement.

UK Patent Application 2,298,553 discloses a remote control system wherein the A.C. supply is interrupted for a predetermined period immediately following a current reversal to transmit an order (0 or 1). The switch does not transmit an analog order.

SUMMARY OF THE INVENTION

The present invention aims at providing a novel solution to transmit an order to a load supply circuit which overcomes the disadvantages of conventional solutions.

The present invention aims, in particular, at providing a simple solution which requires no additional link between the control element and the load supply circuit.

The present invention aims, in particular, at providing a transmitter of an operating order over an A.C. supply line which does not create any dissipation in the transmitter.

More generally, the present invention aims at providing a transmission of an analog order by using the A.C. voltage as a transmission support, without generating any heat dissipation in the transmission and without requiring the use of a high frequency modulation transmission-reception system.

To achieve these and other objects, the present invention provides a transmitter of an analog order over an A.C. supply line for a load, including a one-way conduction element in parallel with a resistive element of variable value that is a function of the analog order to be transmitted.

According to an embodiment of the present invention, the resistive element and its value variation range are chosen to reduce or minimize the power dissipation when conducting a current.

According to an embodiment of the present invention, the one-way conduction element is formed of a diode.

According to an embodiment of the present invention, the resistive element of variable value is formed of a potentiometer.

According to an embodiment of the present invention, the resistive element of variable value is formed of a MOS transistor, the diode then being, preferably, formed by the intrinsic diode of the MOS transistor.

The present invention further provides a method for transmitting information over an A.C. supply line of a supply circuit for a load having a capacitive input impedance including a capacitor adapted to provide an approximate D.C. voltage Vout, and which includes:

on the transmitter side, of varying the peak amplitude of the A.C. voltage every other half-wave; and on the receiver side, of sizing the capacitor so that it can withstand a single-halfwave supply and of extracting from the A.C. voltage an information proportional to the amplitude variation.

The foregoing objects, features and advantages of the present invention, will be discussed in detail in the following non-limiting description of specific embodiments in connection with the accompanying drawings.

DETAILED DESCRIPTION

Figure 1:
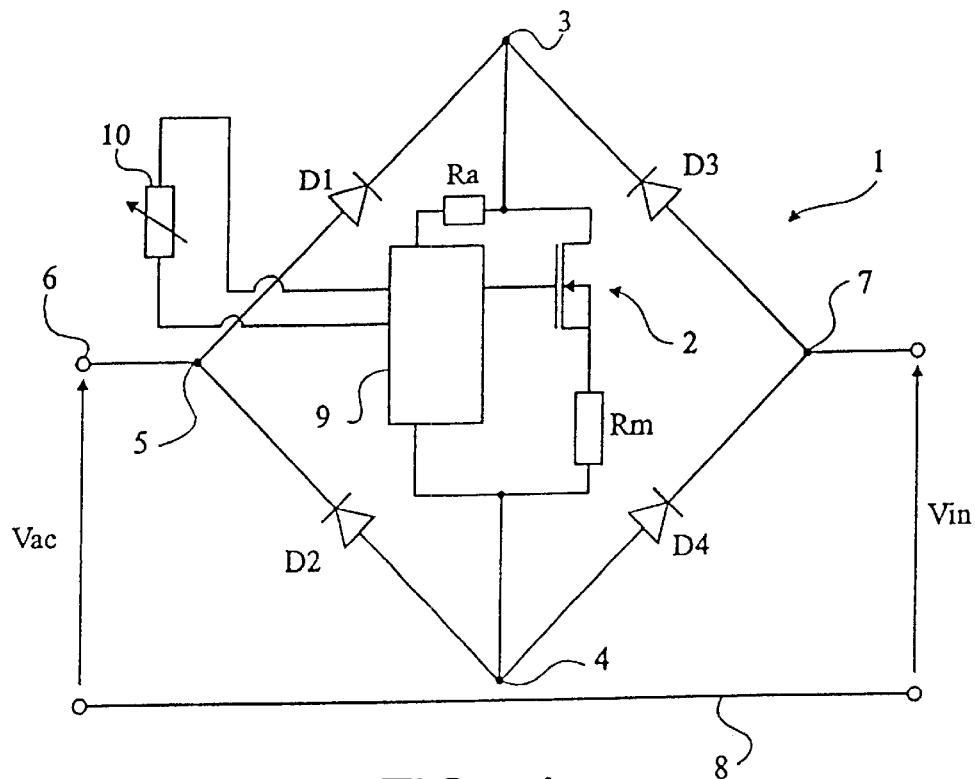
FIGS. 1 and 2, previously described, are meant to show the state of the art and the problem to solve.

The same elements have been referred to with the same references in the different drawings. For clarity, only those elements necessary to the understanding of the present invention have been shown in the drawings and will be described hereafter.

A feature of the present invention is to use one halfwave out of two of the A.C. power supply to transmit the power required to supply the load and the other halfwave to transmit an analog information to the circuits supplying a load from an approximately D.C. voltage obtained by rectifying the A.C. voltage. Thus, according to the present invention, the load supply circuit uses a single-halfwave A.C. voltage and the transmission of the analog information is thus performed without modifying the approximately D.C. voltage used by the load supply circuit. According to the invention, the analog order can then be transmitted by varying the peak amplitude of the A.C. voltage during the halfwave used for transmission, this variation being a function of the order to be transmitted.

Figure 3:
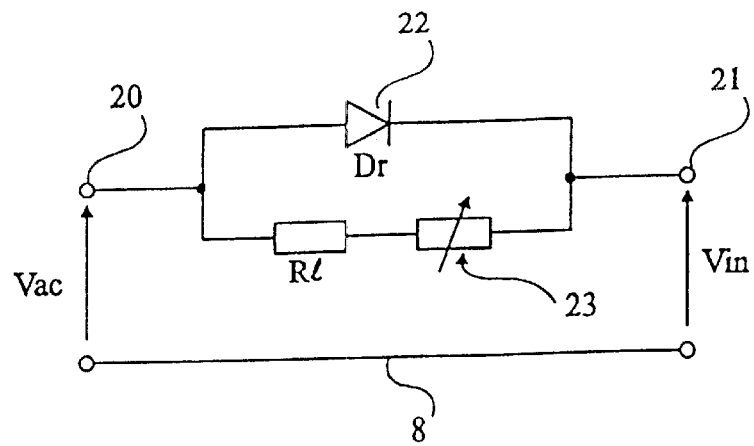
FIG. 3 shows a first embodiment of a transmitter of an analog order according to the present invention.

FIG. 3 shows a first embodiment of a transmitter of an analog order meant for a circuit of supply of a load having a capacitive input impedance according to the present invention.

This transmitter includes, in parallel between two input and output terminals 20 and 21, a one-way conduction component 22 (for example, a diode Dr) and a resistive element 23 of variable value, for example, a potentiometer. In the example shown in FIG. 3, potentiometer 23 is connected in series with a limiting resistor R1. According to the invention, the value of the resistive element is a function of the order to be transmitted and therefore determines the peak voltage amplitude of the halfwaves used for the transmission.

A transmitter according to the present invention is meant to be series-connected on an A.C. supply line. For example, terminal 20 is connected to a first terminal of application of an A.C. voltage Vac, for example, the mains phase. Voltage Vin meant for the load supply circuit then is taken between output terminal 21 of the transmitter and the uninterrupted neutral 8 of the A.C. power supply.

Figure 4A:
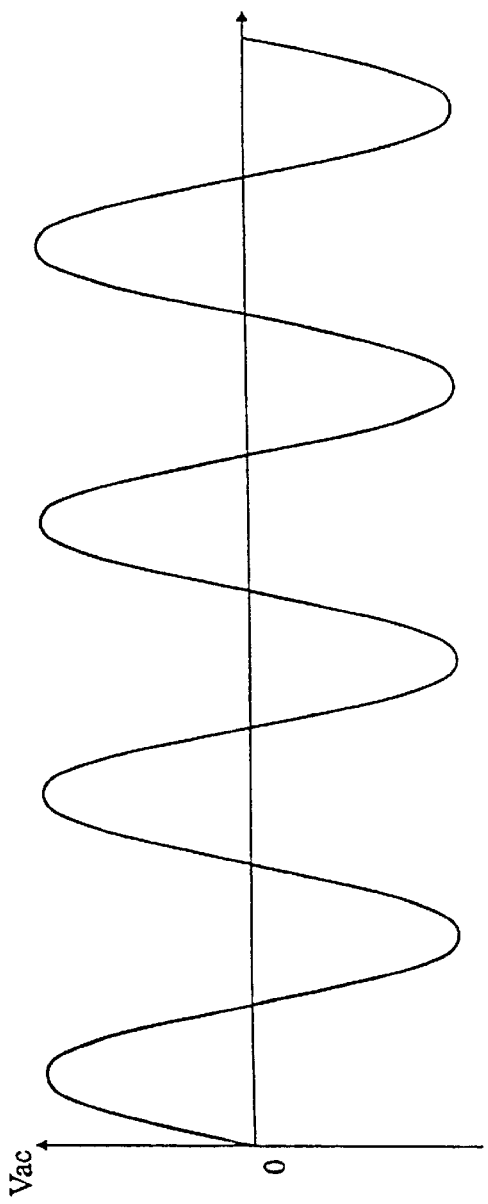
FIGS. 4A and 4B illustrate, in the form of timing diagrams, the operation of a transmitter such as shown in FIG. 3.
Figure 4B:
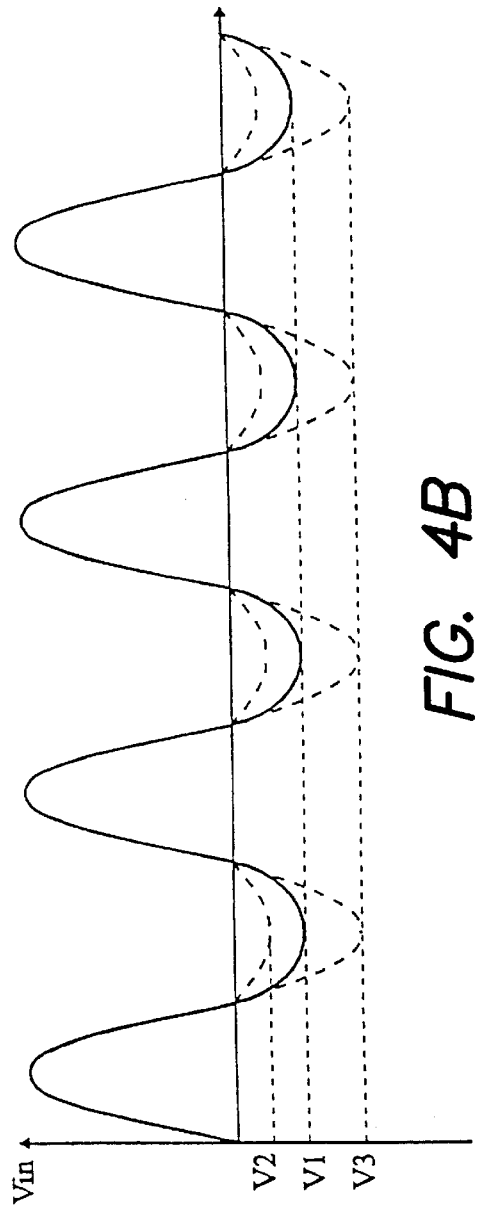

The operation of the transmitter shown in FIG. 3 is illustrated by FIGS. 4A and 4B which show, in the form of timing diagrams, an example of shapes of voltage Vac and Vin.

In the example shown in FIGS. 4A and 4B, diode Dr lets through the positive halfwaves and is blocked during negative halfwaves of voltage Vac. It should however be noted that a perfectly symmetrical operation is obtained by inverting the connection of diode Dr in the assembly of FIG. 3 so that it is conductive during negative halfwaves and blocked during positive halfwaves.

During negative halfwaves, voltage Vin is decreased with respect to A.C. voltage Vac by the voltage drop in the resistive element formed of resistor R and of potentiometer 23 with a resistance linked to the receiver which will be described hereafter. According to the value of potentiometer 23, this decrease is more or less significant. In FIG. 4B, three different settings of potentiometer 23 have been shown, a median setting being illustrated in full line and providing a negative peak value V1 while two extreme settings are illustrated in dotted lines and respectively provide negative peak values V2 and V3.

It should be noted that, whatever the setting of potentiometer 23, the waveform of the positive halfwaves of output voltage Vin is not modified.

Figure 5:
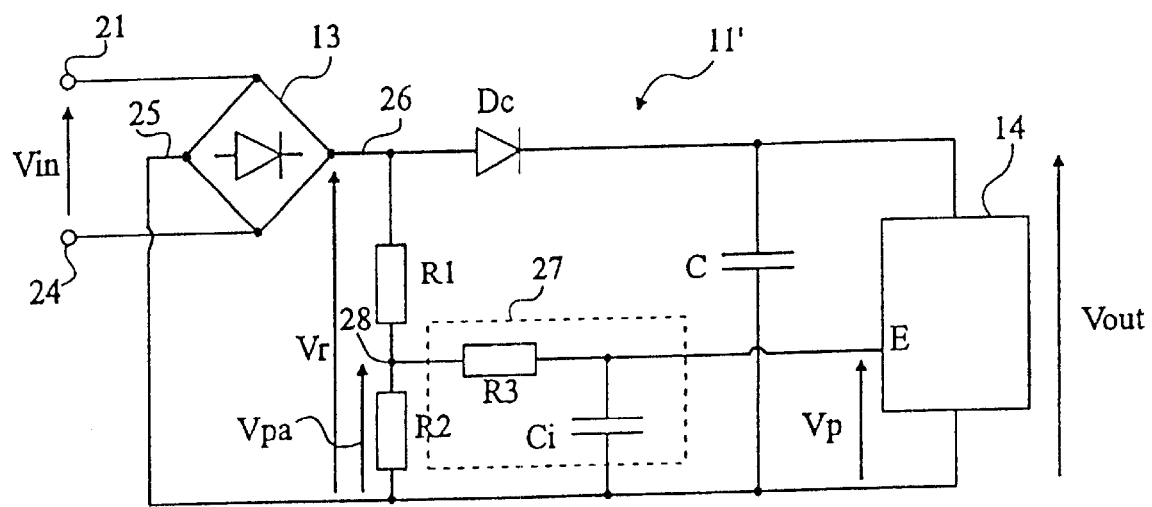
FIG. 5 shows a first embodiment of a circuit of load supply from an approximately D.C. voltage obtained by rectifying an A.C. voltage, adapted to being associated with a transmitter according to the present invention.

FIG. 5 shows a first embodiment of a circuit 11' of supply of a load (not shown) having a capacitive input impedance, adapted to the exploitation of analog information transmitted by a transmitter according to the present invention.

Figure 2:
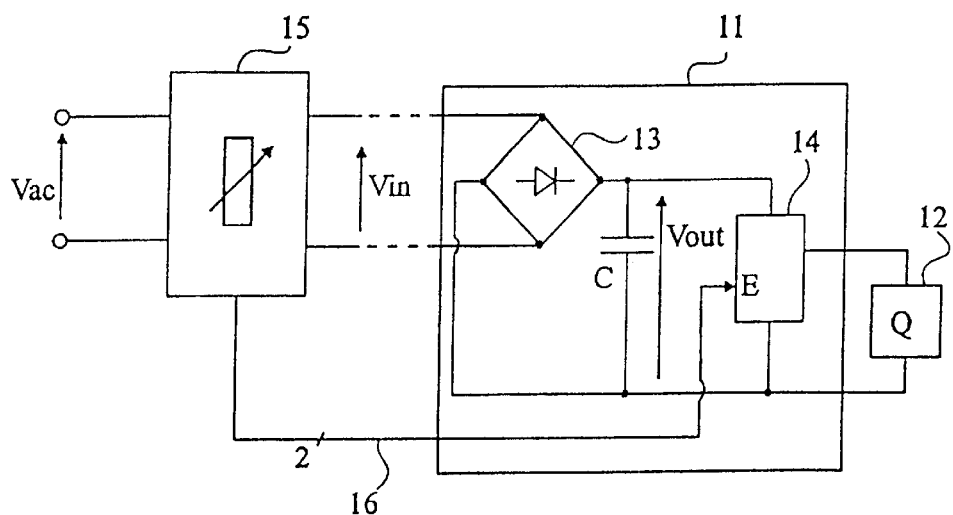

This circuit conventionally includes (FIG. 2) a diode bridge 13, two input terminals of which are connected to two terminals 21, 24 of application of A.C. voltage Vin provided by a transmitter according to the present invention, for example, such as illustrated in FIG. 3.

A first output terminal 25 of bridge 13 forms a reference voltage terminal of circuit 11'. A second rectified output terminal 26 of bridge 13 has, as in a conventional circuit, the object of providing by means of a capacitor C an approximately D.C. voltage Vout to a circuit 14 used to supply a load (not shown).

A feature of a receiver adapted to operating with a transmitter of the present invention is that it includes means for keeping a substantially D.C. voltage Vout across capacitor C, independently from the variations imposed by the transmitter (FIG. 3) on input voltage Vin of bridge 13.

In the example shown in FIG. 5, the receiver includes a diode Dc in series with capacitor C between rectified output terminals 26 and 25 of bridge 13, the anode of diode Dc being connected to terminal 26 and approximately D.C. voltage Vout remaining taken across capacitor C.

The function of diode Dc, or of an analogous one-way conduction element, is to allow rectified output voltage Vr to be taken before its filtering by capacitor C. This is, according to the present invention, indispensable to extract from A.C. voltage Vin provided by the transmitter the analog information carried by the negative halfwaves.

In this embodiment, output voltage Vr of bridge 13, taken between terminals 26 and 25, is applied to two ends of a voltage dividing bridge formed of two resistors R1, R2, connected in series. This dividing bridge is meant to extract from rectified A.C. voltage Vr a low voltage Vpa depending on the level imposed by the transmitter during negative halfwaves. The sizing of resistive dividing bridge R1–R2 of course depends on the amplitude of A.C. supply voltage Vac, on the amplitude desired for analog low voltage Vpa meant for load supply circuit 14 and on the sizing of potentiometer 23 and of its limiting resistor R1 which take part in the ratio between voltages Vpa and Vac. In the example shown in FIG. 5, an integrator circuit 27 is interposed between midpoint 28 of the series connection of resistors R1 and R2 and terminal E of circuit 14 receiving order voltage Vp. The function of this integrator (formed, for example, of a resistor R3 and of a capacitor Ci) is, as will be seen hereafter in relation with FIG. 6B, to convert the variations of A.C. voltage Vpa into D.C. voltage levels.

It should be noted that any other equivalent voltage step-down means may be used instead of the resistive dividing bridge. However, the use of resistors is a preferred embodiment due to its simplicity. Similarly, any other one-way conduction means may be used instead of diode Dc which however is a preferred embodiment on account of its simplicity.

Figure 6A:
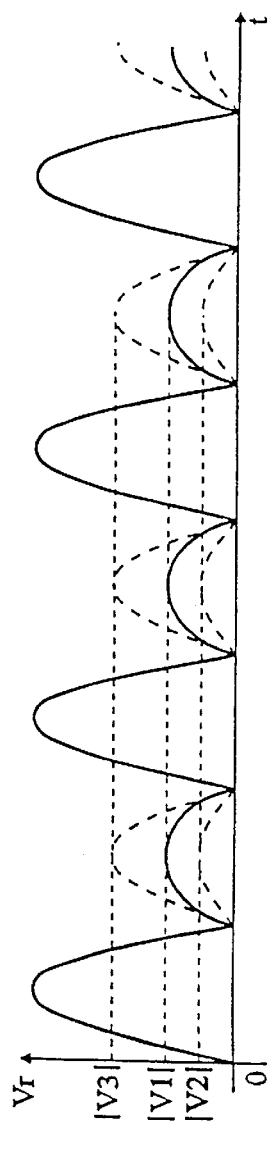
FIGS. 6A, 6B, and 6C illustrate, in the form of timing diagrams, the operation of the circuit of FIG. 5 while using a transmitter such as shown in FIG. 3.
Figure 6B:
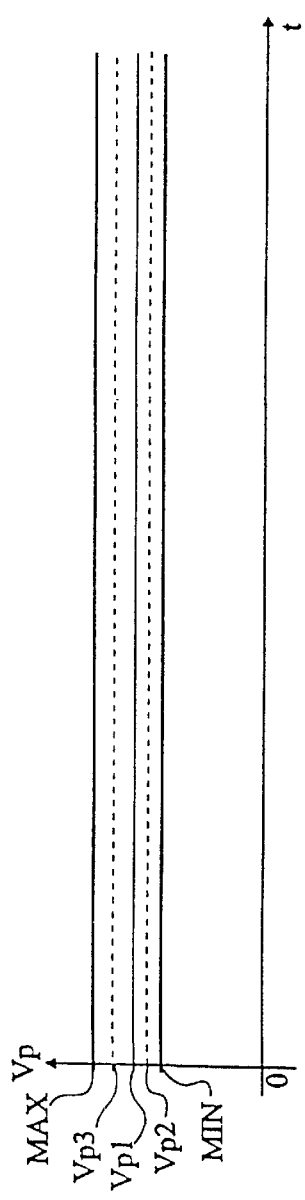
Figure 6C:
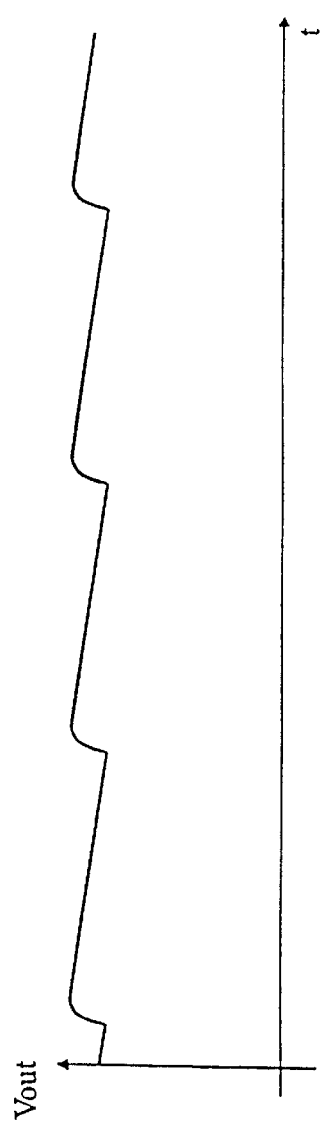

The operation of a receiver such as shown in FIG. 5 is illustrated by FIGS. 6A to 6C which show in the form of timing diagrams an example of shapes of voltages Vr, Vp, and Vout for a voltage Vin such as illustrated in FIG. 4B.

FIG. 6A shows again, on voltage Vr, the three examples of orders set by the transmitter on the negative halfwaves of voltage Vin. The voltage levels set for these negative halfwaves reappear, on voltage Vp, in the form of D.C. levels, due to the integration performed by cell 27. Voltage level Vp1, Vp2, or Vp3 thus is directly proportional to the amplitude V1, V2, V3 of the negative halfwaves determined by the transmitter (FIG. 3). The variations of voltage Vp according to the variations of voltage Vin are limited between two extreme levels MAX and MIN. The minimum level (MIN) corresponds to no voltage Vin during the negative halfwaves and thus to the integration of the sole positive halfwaves of voltage Vac. The maximum level (MAX) corresponds to a voltage Vin for which potentiometer 23 is in its position of maximum resistance.

It should be noted that, on the receiver side, capacitor C is sized to be able to store a sufficient power to enable its recharging only one halfwave out of two. Thus, voltage Vout (FIG. 6C) is maintained at a substantially D.C. level, although voltage Vr undergoes variations in its negative halfwaves.

Preferably, resistances R1, R2, R and the resistance of potentiometer 23 are chosen with sufficiently high values to reduce or minimize the power dissipation in resistor R1 and in potentiometer 23, that is, on the transmitter side, during negative halfwaves.

An advantage of the present invention is that it enables obtaining a voltage variator which has very low power dissipation. Indeed, not only is no resistive element conducting a current, on the transmitter side, during the negative halfwaves but, further, the resistances may be sized to reduce or minimize the power dissipation during negative halfwaves (for example, to a value of less than 1 Watt). Thus, a transmitter according to the present invention can now be, for example, housed in a wall housing to form a voltage variator without raising heat dissipation problems.

Another advantage of the present invention is that the transmitter is of particularly simple structure, especially as compared to a conventional variator such as illustrated in FIG. 1.

Another advantage of the present invention is that it enables obtaining the transmission of any analog order, without adversely affecting the load supply. Further, a transmitter according to the present invention such as shown in FIG. 3 is connected in series on one of the A.C. supply lines (for example, the phase), which eases its installation. It is thus a two-terminal variator.

Figure 7:
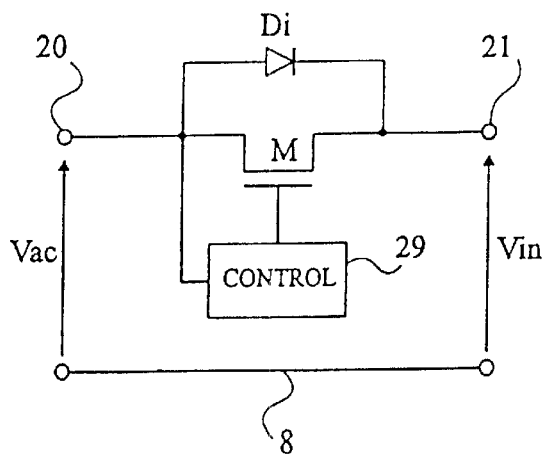
FIG. 7 shows a second embodiment of a transmitter of an analog order according to the present invention.

FIG. 7 shows a second embodiment of a transmitter of an analog order according to the present invention. According to this embodiment, the transmitter is formed of a MOS transistor M placed in series between terminals 20 and 21 and of a diode Di in parallel with transistor M. Transistor M is controlled by a block 29 (CONTROL), an input terminal of which is connected to terminal 20 and an output terminal of which is connected to the gate of MOS transistor M.

Block 29 is meant to provide a voltage adapted to the control of transistor M according to an order. The making of such a block 29 is within the abilities of those skilled in the art based on the functional indications given hereabove. A connection to neutral 8 may be provided depending on the means used.

In this embodiment, a MOS transistor of low power will be used, since it will conduct a low current only during negative halfwaves, diode Di serving to conduct the current flow during positive halfwaves. Accordingly, even for a circuit intended to be supplied by a high A.C. voltage (for example, the 220-volt mains voltage), a MOS transistor which, even though it is a high voltage transistor, is of low power, may be used.

It should be noted that in the case of an assembly such as illustrated in FIG. 7, diode Di may be formed by the internal parasitic diode of the MOS transistor, which further simplifies the transmitter structure.

Figure 8:
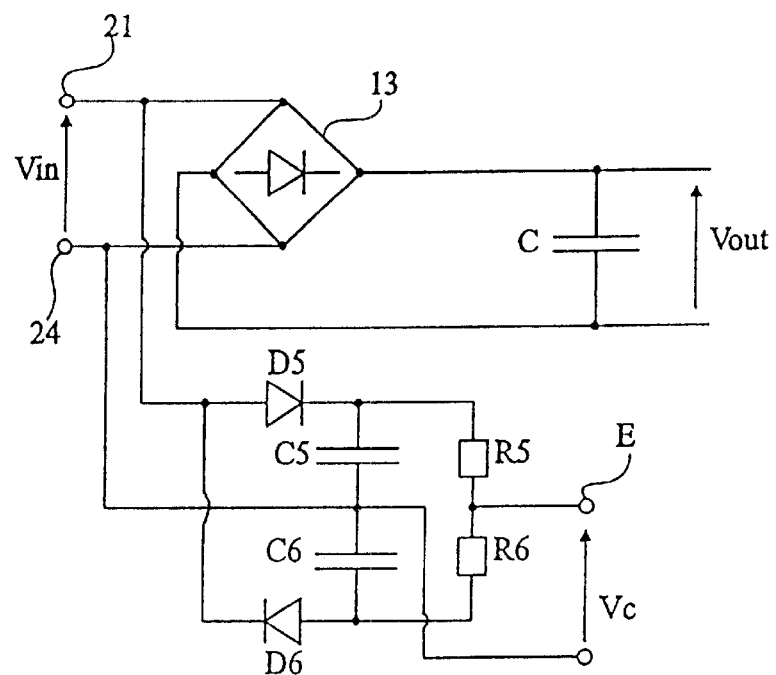
FIG. 8 shows a second embodiment of a receiver circuit according to the present invention.

FIG. 8 shows a second example of a receiver adapted to being associated with a transmitter according to the present invention to exploit an analog order carried by one halfwave out of two of the A.C. supply voltage.

In the example of FIG. 8, the order voltage is taken upstream of rectifying bridge 13, meant to rectify voltage Vin to charge capacitor C of load supply based on a substantially D.C. voltage Vout. For simplification, the load control circuit and the load have not been shown in FIG. 8.

As previously, capacitor C across which voltage Vout is taken is sized according to the load, to store a sufficient power in a single-halfwave operation so that the voltage variation during, for example, negative halfwaves, does not adversely affect the load operation.

In the example shown in FIG. 8, the recovery of the analog order is performed upstream of bridge 13. Terminal 21 is connected to the anode of a first diode D5, the cathode of which is connected, via a resistor R5, to terminal E. A second diode D6 is connected, by its cathode, to terminal 21, its anode being connected, via a resistor R6, to terminal E. Two clipping capacitors C5, C6, are respectively connected between terminal 24 and the midpoint of the respective series connections of diodes D5, D6 with resistors R5, R6.

Control voltage Vc taken at the midpoint of the series connection of resistors R5 and R6 corresponds to voltage Vin minus the ratio between resistances R5 and R6 which are, preferably, of the same value. Capacitors C5 and C6 are used to filter the peak of the positive and negative halfwaves of A.C. voltage Vin. Voltage Vc can afterwards be exploited by an adapted circuit, for example, by a circuit of comparison of the respective peak values of the positive and negative halfwaves which then provides an indication directly proportional to the order given by the transmitter.

The choice of the receiver of the analog order depends on the application. The use of an embodiment such as illustrated in FIG. 8 will be, for example, useful when the structure (rectifying bridge and capacitor C) of the circuit that provides voltage Vout cannot be modified to insert diode Dc (FIG. 5).

An analog order transmitter of the present invention has many applications.

Among these applications, one could mention as an example the application to a receiver formed of a fluorescent lamp control circuit, the transmitter then being used to vary the light intensity in the lamp. Such a fluorescent lamp control circuit is generally formed of a bridge and of a capacitor intended to provide, for example, for an A.C. voltage Vin of 220 volts, a D.C. supply of 300 volts to a switched-mode converter of "symmetrical half-bridge" type. This converter provides an alternating current at a high frequency (generally on the order of 30 kHz) to a fluorescent lamp via a high frequency inductance. The converter generally is formed of a control circuit associated with two switches (for example, two power MOS transistors) connected in series across the capacitor providing the substantially D.C. voltage. The midpoint of the series connection of the power transistors is connected to a first terminal of the high frequency inductance connected in series with a first filament of the fluorescent lamp. A capacitor of low value generally connects the first filament to a second filament of the fluorescent lamp and participates in the triggering of said lamp. The control circuit of the power transistors is, for example, an integrated circuit known under trade name L6574 and manufactured by SGS-Thomson Microelectronics. In such a circuit, the light dimming function of the lamp is performed from a low voltage analog input receiving, by implementing the present invention, order voltage Vp (FIG. 5).

In such an application, the use of a system according to the present invention has many advantages.

First, it is now possible to have a light dimming function without requiring additional low voltage leads between a switch and the lamp. Further, the transmitter of the light intensity order is of a particularly reduced bulk, which facilitates its implantation in a switch.

Of course, the present invention is likely to have various alterations, modifications, and improvements which will readily occur to those skilled in the art. In particular, the sizing of the different components of the system according to the present invention will be adapted according to the application and, in particular, according to the desired supply voltage and excursion range for the low order voltage. Further, other receivers than those taken as an example may be used provided that they respect the described functionalities and that they enable, in particular, maintaining a substantially D.C. voltage to supply the load by only using one halfwave out of two of the A.C. voltage. Moreover, other variants may be added to the described embodiments for the analog order transmitter of the present invention, provided that the feature of parallel association of a one-way conduction element of low dissipation with a resistive element of variable value is respected.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A transmitter of an analog order over an A.C. supply line for a load, including a one-way conduction element in parallel with a resistive element having a value that is a function of the analog order to be transmitted.

2. The transmitter of claim 1, wherein the resistive element and its value variation range are chosen to reduce the energy dissipation when conducting a current.

3. The transmitter of claim 1, wherein the one-way conduction element is formed of a diode.

4. The transmitter of claim 3, wherein the resistive element of variable value is formed of a potentiometer.

5. The transmitter of claim 3, wherein the resistive element of variable value is formed of a MOS transistor and the diode is formed by the intrinsic diode of the MOS transistor.

6. A method for transmitting an information signal over an A.C. supply line that carries an A.C. voltage having a first half wave and a second half-wave, comprising the steps of:

varying a peak amplitude of the first half-wave of the A.C. voltage on the A.C. supply line in proportion to an amplitude of the information signal;

extracting the information signal from the peak amplitude; and extracting a supply voltage of the A.C. supply line from the second half-wave.

* * * * *